US00RE36055E

United States Patent [19]

Preston

[11] E Patent Number: Re. 36,055

[45] Reissued Date of Patent: Jan. 19, 1999

[54] METHOD OF MANUFACTURING ELECTRODES

[76] Inventor: Daniel Preston, 537 Greenwich St. 6th Flr. South, New York, N.Y. 10014

[21] Appl. No.: 641,095

[22] Filed: Apr. 29, 1996

Related U.S. Patent Documents

Reissue of:

[64] Patent No.: 5,378,183
Issued: Jan. 3, 1995
Appl. No.: 46,411
Filed: Apr. 12, 1993

[51] Int. Cl.[6] ..... H01J 9/26

[52] U.S. Cl. ..... 445/26; 445/67; 65/138; 65/155; 65/42

[58] Field of Search ..... 445/9, 17, 26, 445/67; 65/42, 138, 155

[56] References Cited

U.S. PATENT DOCUMENTS

| | | | |
|---|---|---|---|
| 1,121,802 | 12/1914 | Clark | 445/9 |
| 1,637,989 | 8/1927 | Eisler | 65/155 X |
| 2,447,158 | 8/1948 | Cartum | 65/57 |
| 2,549,359 | 4/1951 | Bakanan | 445/67 |
| 2,565,125 | 8/1951 | Flaws | 445/67 X |
| 2,672,711 | 3/1954 | Nash | 65/155 |
| 3,395,007 | 7/1968 | Schor | 65/42 |
| 3,685,881 | 8/1972 | Rochet | 445/27 |

*Primary Examiner*—Kenneth J. Ramsey

[57] ABSTRACT

An improved design and method and of manufacturing a luminous tube electrode comprises the steps of placing an electrode shell in an outer tube and allowing conductors connected to the electrode shell to emanate from an open end of the outer tube. A tubulation with a flared end is then butted up against the end of the outer tube, thereby sandwiching the conductors between the flared end of the tubulation and the outer tube. The flared end of the tubulation are then fused to one another forming a hermetic seal between each other and the conductors, resulting in the finished electrode. A further provision is made to blow a bubble in the tubulation.

14 Claims, 3 Drawing Sheets

METHOD OF MANUFACTURING ELECTRODES

Matter enclosed in heavy brackets [ ] appears in the original patent but forms no part of this reissue specification; matter printed in italics indicates the additions made by reissue.

TECHNICAL FIELD

This invention relates to luminous tube signage, and more particularly, to an improved design and method for manufacturing electrodes utilized with luminous tube signage.

BACKGROUND OF THE INVENTION

Luminous tube signage has been used for decades. Typically, a tortuous length of glass tubing is formed into the desired design. Next, electrodes are sealed to either end, with one electrode being tubulated. The tube is then processed: baked, exhausted, backfilled and sealed. A transformer then applies voltage across the electrodes and causes the gas to give off light The manufacture of the electrodes is time consuming and labor intensive. FIG. 1 shows a prior art arrangement for manufacturing such electrodes. Typically, an electrode shell 10 includes two conductors 12 attached thereto. The conductors are inserted into die block holes 14. A tungsten mandrel 15 is arranged beneath the tubulations and moves up into the tubulation as described below.

In operation, the entire arrangement of FIG. 1 is spun and heat is introduced in the area labeled 20 where the outer tube and inner tubulation overlap. Once outer tube 22 and inner tubulation 18 are red hot and plastic, the tungsten mandrel moves up inside the tubulation. Immediately thereafter, two press blocks (not shown for clarity) press area 20 inward, forming what is known in the industry as a pinch seal. The mandrel is then removed and the part annealed.

FIG. 1A shows the finished electrode. FIG. 1B is a side view of the finished electrode of FIG. 1A.

The problem lies in the fact that the parts must be loaded by hand. The process of inserting two wires attached to an electrode shell into two holes cannot be automated.

The prior art process for manufacturing electrodes is somewhat automated, but the machines must be manually loaded. Manual loading limits production drastically, and increases "shrinkge"; i.e. broken parts due to operator errors.

For example, the design of a neon electrode necessitates manual loading by an operator. On an 8 head machine, an operator must perform a lengthy sequence of steps including (i) load a tubulation, (ii) insert an electrode shell with its two conductors engaged into two 0.030 diameter holes (iii) load an outer tube, and (iv) remove one finished part. This sequence is typically performed every 12 seconds, constantly, all day. The process produces approximately 300 electrodes per hour, less shrinkage of about 5% for a good operator.

Consider a glass part designed to be mass produced, such as a glass stem for a florescent lamp or a light bulb. These parts are produced without labor on a machine producing approximately 4000 per hour with about 2% shrinkage.

In view of the above, it can be appreciated that there exists a need for an improved design and manufacturing process for luminous tube electrodes which allows full automation and mass production.

SUMMARY OF THE INVENTION

The above and other problems of the prior art are overcome in accordance with the present invention which relates to a manufacturing technique for producing luminous tube electrodes. In accordance with the present invention, an outer tube is placed around a mandrel, and an electrode shell with its conductors attached is dropped onto the mandrel within the outer tube. The electrode shell is placed on the mandrel preferably upside down (relative to the prior art). The conductors need not be inserted into small holes. The outer tube circumferencially surrounds the outer perimeter of the electrode shell and the conductors emanate freely out of the top of the outer tube.

A tubulation is placed between the conductors and is preferably outwardly flared so that the flared end meets the end of the outer tube from which the conductors emanate. The conductors are thereby sandwiched between the flared end of the tubulation and the end of the outer tube from which they emanate. The tubulation and tube are then heated and fused together (i.e., a butt seal is formed), resulting in the electrode shell being contained within the outer tube and its conductors emanating to the outside at the point where the tubulation and outer tube meet.

Since the technique utilizes a "butt" type seal rather than a pinch seal, no mandrel is needed inside the tubulation to prevent it from closing. For purposes of explanation herein, a pinch seal is defined as the seal formed when the tubulation is placed partially inside the outer tube, and the outer tube is heated and pinched against the tubulation. A butt seal is the seal formed when the end of the tube is pressed against the end of the tubulation, and the junction of the two ends is heated.

DETAILED DESCRIPTION OF THE PREFERRED EMBODIMENTS

Figure 2:
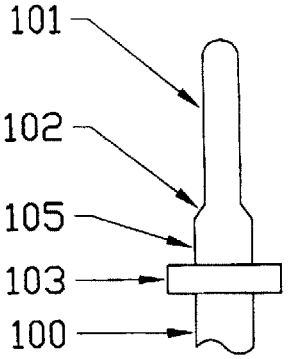
FIG. 2 shows a mandrel mounted on a rotatable shaft which may be utilized for practice of the present invention.

FIG. 2 shows a mandrel 102 including an outer portion 105 and a shell holder 101. Collar 103 functions to set the height of the outer tube. Shaft 100 rotates, and is connected to a suitable drive for this purpose.

Figure 3:
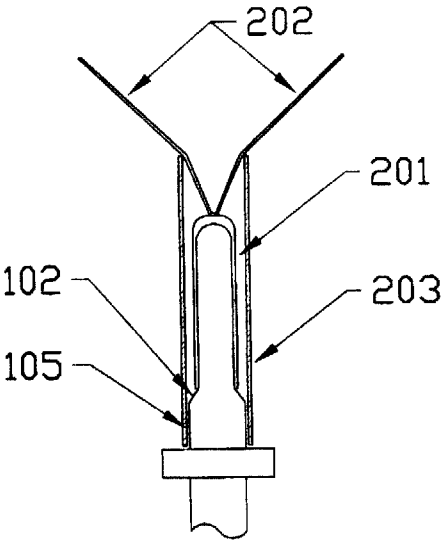
FIG. 3 depicts an outer tube with an electrode shell loaded on the mandrel of FIG. 2.

FIG. 3 shows an outer tube 203 placed on the mandrel 102. The mandrels are manufactured in various sizes so that they can be removed and replaced with mandrels of various sizes and/or shapes. In the particular embodiment of FIG. 3, mandrel 102 is chosen such that its outer portion 105 is just slightly less than the inner diameter of outer tube 203. In this fashion, the outer portion 105 of mandrel 102 will hold the outer tube 203 in place and prevent it from wobbling from side to side. Typical values of standard outer tubing range from 8–15 millimeters (outer diameter), but this can vary.

An electrode shell 201 includes two conductors 202 attached thereto. As shown in FIG. 3, the electrode shell is dropped over the portion of the mandrel 101 and the conductors 202 emanate from the end of outer tube 203.

Figure 4:
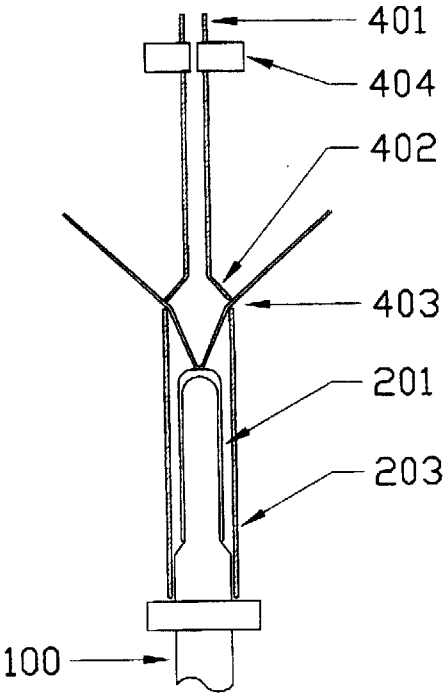
FIG. 4 shows a tubulation and outer tube positioned together during a step of the inventive method.

FIG. 4 shows the arrangement of FIG. 3 with the further addition that the tubulation 401 including flared end 402, is shown butted up against the end 403 of outer tube 203. A typical value of the diameter of tubulation 401 is 5 millimeters, but this can vary depending upon the application.

Tubulation 401 is held in place by a suitable clamp 404 or other method. The particular technique used is not critical to the present invention.

In operation, as shaft 100 rotates, heat is introduced at location 403. Clamp 404 is connected to shaft 100 so that all the components: tube 203, shell 201 with conductors 202, and tubulation 401, all rotate in unison. The complete assembly is termed a "head".

As the tubulation and tube spin, they are butt sealed to each other. When the flared end 402 and the end of tube 203 are red hot, they are pushed together and worked slightly together and apart while in the fire to ensure a good seal. The clamp 404 or the mandrel may move up and down to perform this step.

As is well known in the art, the portion of the conductors that seals to the glass is special wire with a matching coefficient of expansion to the glass. For example, Dumet wire works well with lead glass. The matching coefficients prevents the finished seal from being too stressed and breaking. Unlike prior art arrangements, a pinch seal is not utilized.

Figure 1B:
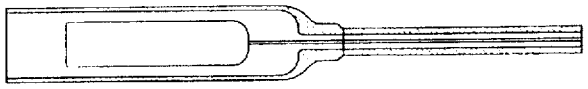
FIG. 1B is a side view of FIG. 1A.
Figure 1A:
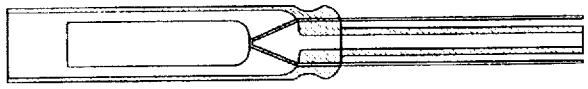
FIG. 1A shows a neon tube electrode resulting from the prior art arrangement of FIG. 1.
Figure 1:
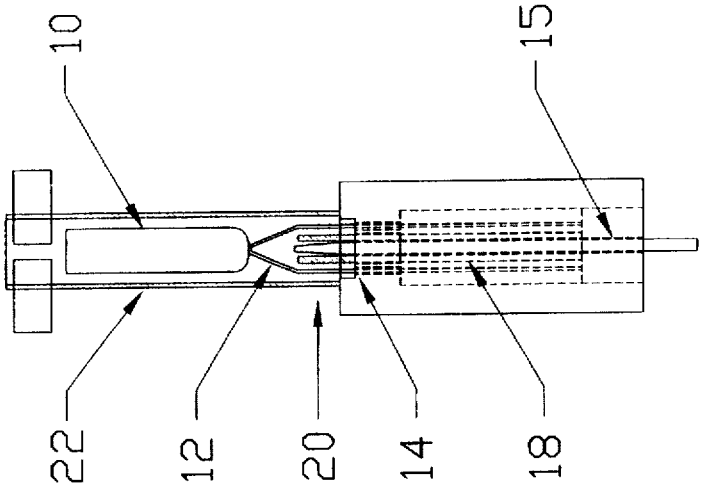
FIG. 1 shows a typical prior art arrangement for constructing neon tube electrodes.
Figure 5:
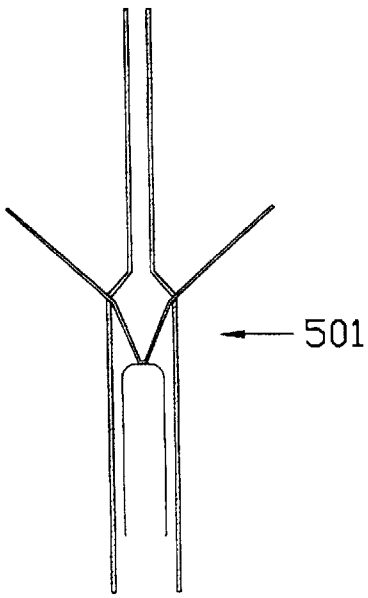
FIG. 5 shows a completed electrode resulting from practice of the present invention.

As shown in FIG. 5, the finished electrode can then be removed with the electrode shell therewithin, resulting in a usable electrode 501.

As an optional enhancement to the present invention, a technique is provided for blowing a bubble along the inner tubulation 401. This is desired for the reasons set forth below.

Figure 7:
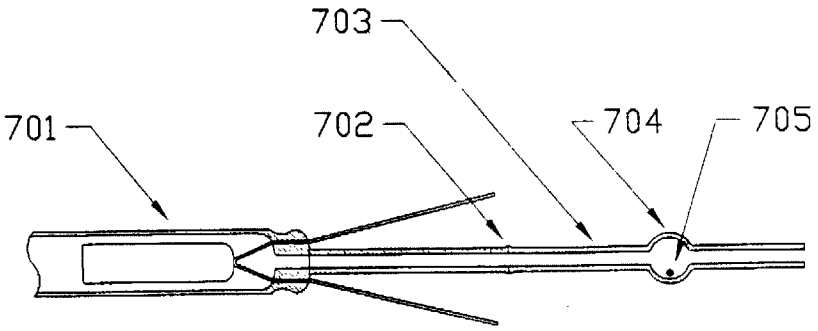
FIG. 7 shows a prior art electrode and a tube with a bubble and mercury drop spliced to the tubulation.

The majority of neon tubes are actually filled with argon and mercury. To insert the mercury into the tube, it is known in the art to splice a glass tube, usually 5–6 mm in diameter, to the electrode's tubulation and blow a small bubble approximately 15 mm in diameter in the glass tube. FIG. 7 shows such a tube of glass 703, with a bubble 704, spliced at point 702 to electrode 701. Once cooled, a small amount of mercury 705 is injected into the bubble 704. As is well known in the art, the arrangement is next connected to a manifold and processed. It would therefore be of great value and convenience if the electrodes came with the bubble already in the tubulation. The machine used to produce prior art electrodes cannot blow a bubble in the tubulation because the tubulation is encased by the die block during manufacture.

Figure 6:
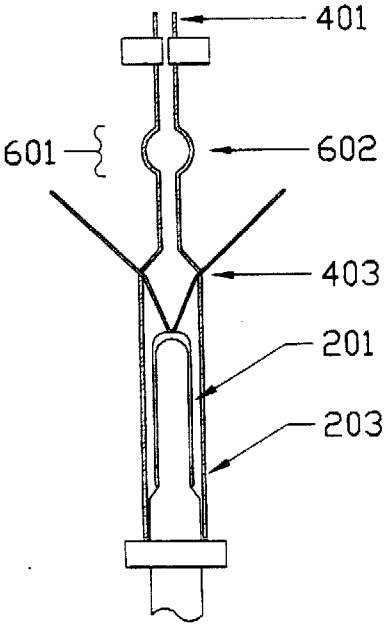
FIG. 6 depicts an optional enhancement to the present invention wherein a bubble is blown in the tubulation.

As shown in FIG. 6, the present invention includes a technique for providing the bubble. After the flame is utilized at junction 403 of tubulation 401 and outer tube 203, a different flame may be utilized to soften a portion 601 of tubulation 401. A bubble is then blown in tubulation 401 by injecting a small burst of air is into the top thereof. Since the heated portion is softer than the remainder of the tubulation 401, bubble 602 is formed. The resulting electrode arrangement is identical to that of FIG. 5 with the exception that the small bubble 602 would be contained in tubulation 401.

Figure 8:
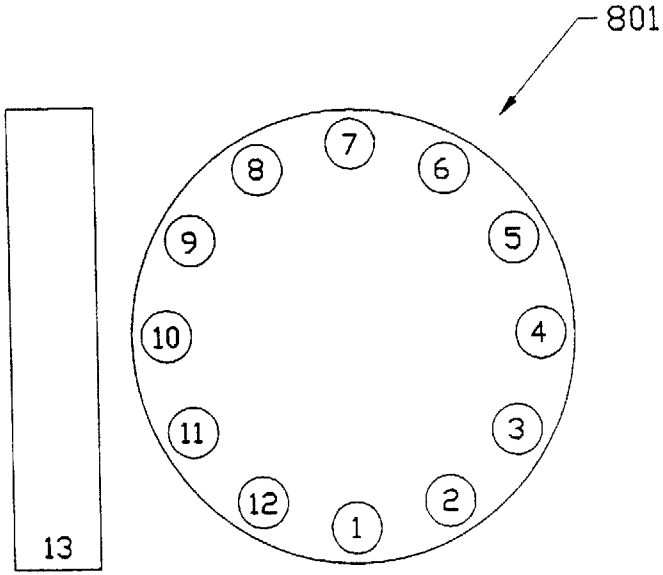
FIG. 8 depicts a rotary index machine with an annealer to be used in an additional embodiment of the invention.

The operations described hereinbefore may be performed conveniently and quickly on a rotary head index machine. More specifically, several rotating assemblies are mounted on a dial plate that indexes in a circle as shown in FIG. 8. The entire rotary index 801 moves from one position to the next and the operations performed at each position are different. Each position has stationary tooling, e.g. torches or mechanisms for inserting or removing a part, etc., in a similar manner to an assembly line. For example, the following table shows how the arrangement could be set up:

| Position | Operation |
|---|---|
| 1. | Tube loaded |
| 2. | Shell loaded |
| 3. | Tubulation loaded |
| 4. | Preheat area 403 |
| 5. | Heat area 403 |
| 6. | Heat and work the glass |
| 7. | Cool area 403 and preheat tubulation area 601 |
| 8. | Heat tubulation area 601 |
| 9. | Heat & Blow bubble 602 |
| 10. | Cool |
| 11. | Cool |
| 12. | Remove the finished part. |
| 13. | Anneal the finished part |

Of course, other arrangements may be set up. The important advantage is that the entire process can be automated. While the above describes a preferred embodiment of the present invention is understood that various other modifications and/or additions may be made by those of ordinary skill in the art without violating the spirit or scope of the present invention. For example, any shape of flared end may be used. Indeed, the flare may even be eliminated and the tubulation made the same diameter as the outer tube. The tubulation and tube may be pulled away from one another after the seal is formed, in order to form a constriction. The electrode may be turned upside down from the way it is shown in the figures herein, however, it would then need to be mounted on the shell holder 101 so that it does not fall off. A vacuum on the shell holder or a pair of clips would suffice for this purpose. The rotating assemblies need not rotate. The fires at each position can be moved back and forth instead. Other modifications and/or additions will be apparent to those of ordinary skill in the art

I claim:

1. A method of manufacturing an electrode comprising the steps of:

placing an electrode shell within an outer tube and on an electrode shell holder such that conductors connected to said electrode shell emanate freely from an end of said outer tube placing a tubulation against an end of said outer tube thereby sandwiching said conductors between said outer tube and said tubulation; and fusing said tubulation to said outer tube.

2. The method of claim 1 wherein said step of fusing comprises a step of rotating said outer tube and said tubulation while heat is applied at a junction thereof.

3. The method of claim 1 wherein said tubulation includes a flare at an end thereof.

4. The method of claim 3 further comprising the step of working said outer tube with respect to said tubulation.

5. The method of claim 4 wherein a plurality of said steps are performed while said outer tube is mounted on a rotary index.

6. The method of claim 3 further comprising the step of forming a bubble in a portion of said tubulation.

7. Apparatus for forming luminous tube electrodes comprising a mandrel for holding an electrode shell thereon;

means for supporting an outer tube to circumferentially surround the electrode shell while allowing the conductors to freely emanate from an end thereof;

means for butting a tubulation against an end of said outer tube;

means for fusing said tubulation to said outer tube.

8. Apparatus of claim 7 further comprising:

a shaft connected to said mandrel;

means for rotating said shaft, thereby rotating said mandrel.

9. Apparatus of claim 1 further comprising:

means for heating a portion of said tubulation; and means for blowing a bubble in said tubulation.

10. Apparatus of claim 9 further comprising means for working said inner and outer tubulations.

11. A method of forming a luminous tube electrode comprising the steps of:

placing an electrode shell within an outer tube and on an electrode shell bolder, said outer tube having an end;

placing an end of a tubulation against said end of said outer tube to form a junction; and fusing said tubulation to said outer tube at said junction.

12. The method of claim 11 wherein said electrode includes at least two conductors attached thereto.

13. The method of claim 11 wherein said tubulation includes a flare proximate to the end thereof.

*14. A method of producing an electrode comprising the steps of:*

*a) placing an outer tube proximate to a tubulation;*

*b) positioning an electrode shell within said outer tube;*

*c) merging said tubulation to said outer tube;*

*d) heating a predetermined length of said tubulation; and*

*e) injecting gas through said tubulation and outer tube to thereby cause a bubble to be formed in said tubulation.*

* * * * *